Nov. 29, 1966         J. S. WOLFE         3,287,981
GENERATION OF ROTATIONS ABOUT A FIXED POINT WITH SYMMETRIC
AND NEAR SYMMETRIC DISTRIBUTION OF TANGENTIAL VELOCITY
COMPONENTS AND ROTARY COMPONENTS
Filed May 20, 1964                    2 Sheets-Sheet 1
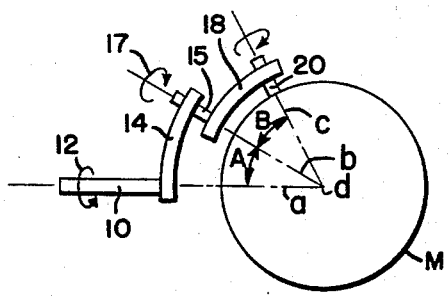
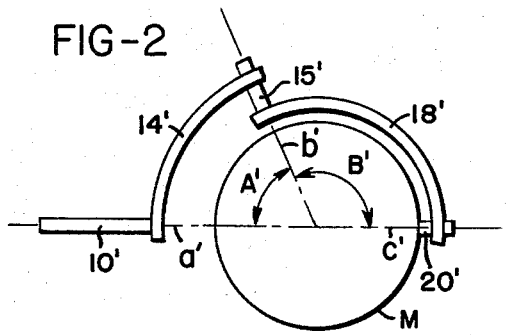
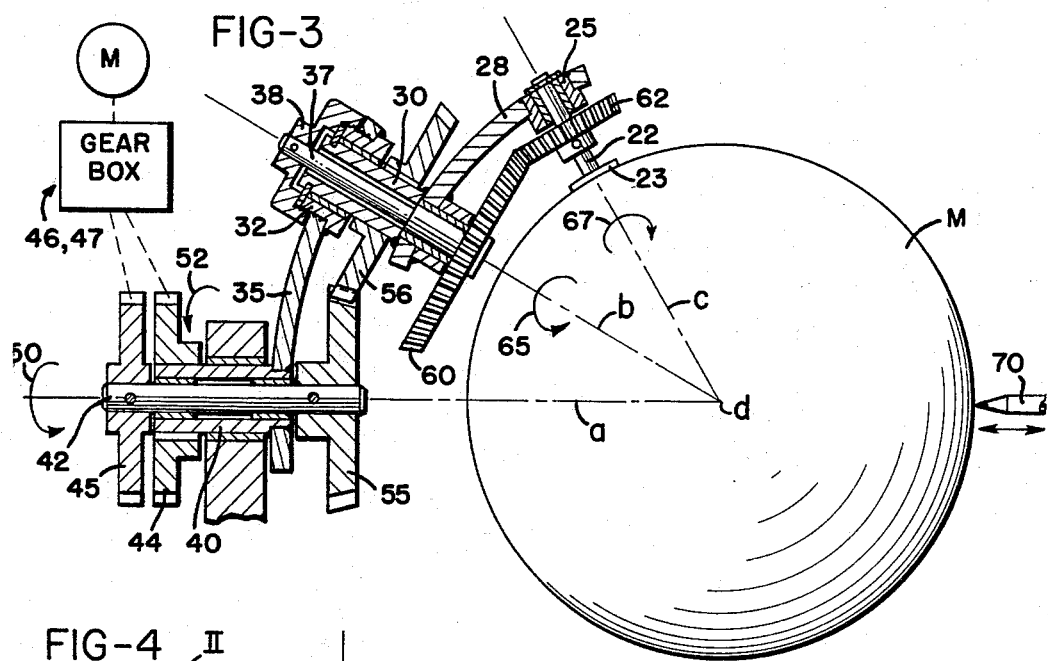
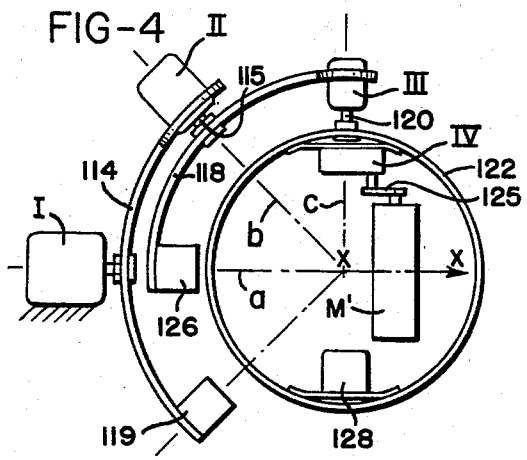
INVENTOR.
JOHN SOHN WOLFE
BY
*Marechal, Biebel, Frencher Bugg*
ATTORNEYS

*INVENTOR.*
JOHN SOHN WOLFE
BY

*ATTORNEYS*

United States Patent Office 3,287,981
Patented Nov. 29, 1966

3,287,981
GENERATION OF ROTATIONS ABOUT A FIXED POINT WITH SYMMETRIC AND NEAR SYMMETRIC DISTRIBUTION OF TANGENTIAL VELOCITY COMPONENTS AND ROTARY COMPONENTS
John Sohn Wolfe, 741 Torrington Place, Dayton, Ohio
Filed May 20, 1964, Ser. No. 368,812
5 Claims. (Cl. 74—1)

Recent work in the field of kinetics indicates that mass under a state of changing acceleration acquires a temporary increment of mass which varies in magnitude as the rate of change in acceleration or the surge. As a practical matter, his condition is difficult to study, since a mass in linear motion subject to these conditions will quickly leave the scene, while under most conditions a mass in rotational motion under these conditions will fly apart due to the extreme centrifugal force conditions generated. The present invention provides a device which produces, in a mass, a constant surge condition having both tangential velocity and rotary surge components. These components are symmetrically distributed over the mass and are so related that one is maximum when the other is minimum. It can be said that this device provides a symmetrical distribution of surge components in a three dimensional moton with respect to the mass center. The device is thus useful as a demonstration device and for the study of these effects, in addition to being useful in a number of different practical embodiments, such as a molding machine or a device for producing hollow spheres of uniform dimension within close tolerance.

According to the invention, a mass is located simultaneously upon three different axes which intersect at the mass center. These will be designated hereinafter as the primary, secondary, and tertiary axes of rotation from the outside inward. These axes have a predetermined angular relationship, as will be explained, the result of which is that during operation the primary and tertiary axes attain a condition of linear concidence, i.e., they extend along the same line for an instant during each cycle of rotation of the device. The rotations imposed on the mass by rotating the primary and tertiary axles must be arranged to cancel when this momentary condition of linear coincidence occurs. The relationship of relative rotation can be expressed as "$W_a:W_b:W_c$:" Wherein $W_a$ equals $-W_c$, and wherein $W_a:W_b$ is a ratio of integers generally less than ten.

With reference to the drawings, it will be seen that, for any oblique angular value of the primary and secondary arms the direction of the input to the secondary axis makes a difference in the shape of the curve traced out on the moving sphere. When the angles are right angles, however, the two curves become identical. Hence, in specifying input velocity ratios it is necessary to state whether the secondary is in the same directon as, or opposed to, the primary, for any oblique value of the arm angles. For right angles the distinction becomes meaningless.

When a mass is in a state of rest (stasis) its rate of position change or velocity is zero, and likewise the acceleration, which is the rate of velocity change is zero. As long as it remains at rest, the acceleration does not change, and the surge remains at zero. These four terms, position, velocity, acceleration and surge are, of course, related, since each of them except the first is the rate at which the preceding term undergoes change, or its first derivative with respect to time.

Considering the effect of these conditions upon a participant, the absolute effects of stasis and of uniform linear motion are subjectively identical; they do not inherently give rise to a sensation of motion. But if the acceleration has a non-zero value, there is a sensation of weight and if the acceleration changes, there is a distinct sensation of a surge or a jerk or a shock, depending on its violence.

The situation in the case of rotary motion is somewhat different. Stasis or nonmotion is of course the same as with the preceding case, but the difference arises with uniform motion, since rotation at a constant rate gives rise to the same sensation as linear motion at an accelerated rate, a sensation of weight. This, of course, is due to the fact that although the rotation about an axis is uniform, there is a constantly occurring change of direction due to the circular path followed by the mass about the axis of rotation. To go a step further, uniformly accelerated rotation in a centrifuge gives rise not only to a sensation of increasing weight but also to a sensation of surge because the rate of weight increase is not constant with respect to time.

Until recently it has been assumed that in all of these situations the mass term functions as a constant value, but in the last ten years it has been found that a mass increment effect accrues whenever there is a condition of surge. The difficulty of putting this effect to use arises from the necessarily temporary duration of the effect, since as mentioned a particle or mass maintained under surge in linear motion quickly leaves the scene, while a centrifuge maintained under surge quickly flies apart as the limit imposed by the strength of its components is exceeded.

The present invention includes a consideration of the effect of a motor species distinct from either linear or rotational motion, being a highly restricted subclass of that species of motion which is designated "rotation around a point" or "motion of a rigid body having one point fixed."

Although it is impossible to move a sphere in a manner to produce equal tangential velocities over its entire surface, it is nevertheless possible to produce motions of this species which have a degree of symmetry in the distribution of these components. When motion of this sort is imposed upon a mass, for example a sphere, the effect will be to obtain a continuing state of surge for the object considered in its entirety, even though the individual components of surge are exceedingly and continuously variable from one point to another, and may be positive or negative depending upon the rate of change of acceleration or deceleration at different points.

Up to this point all the discussion has been concerned with symmetric members of the class of triaxial displacement in which the $W_a:W_b:W_c$ ratio contains the relationship $W_a$ equals $-W_c$, and the integers generally do not exceed ten. It may be desirable in some cases to approximate symmetric motion but avoid producing it exactly, as in the guiding of tools for polishing spherical surfaces, where tracking must be avoided. In this case, any desired degree of asymmetry may be introduced by changing $W_a$ and $W_c$ from equal to not-quite-equal opposites. Instead of a ratio such as 4:7:—4, for instance, it might be desirable to use 40:70:—39, or even a distortion of the ratio to some value such as 40:70:—19, wherein the $W_c$ is near some multiple or divisor of the $W_a$ term. Where kinetic effects are not of concern, and the velocities are low, these asymmetric ratios are desirable; where kinetic effects are desired, the symmetric ratios produce maximal effect.

Accordingly, the primary object of this invention is to provide a device for obtaining a continuous state of surge in a mass.

Another object of the invention is to utilize triaxial motion, of symmetric and near symmetric varieties, to obtain the effect of incremental mass.

Another object of this invention is to provide apparatus which will move a mass in such a way that the tangential velocities over its surface are distributed in a symmetrical manner while the mass is rotated simultaneously about three different axes which intersect at the center of the mass.

A further object of the invention is to provide a device which provides a symmetrical distribution of surge components in a three dimensional motion with respect to the center of a mass, whereby the effects of conditions of surge can be studied.

Another object of the invention is to provide apparatus for rotating a mass simultaneously about three different axes which intersect at the mass center, and which have predetermined angular relationships and predetermined rotational speed relationships such that during operation of the device the primary and tertiary axes attain a condition of linear coincidence and the rotational effects induced about these two axes cancel when this momentary condition of linear coincidence occurs.

Other objects and advantages of the invention will be apparent from the following description, the accompanying drawings and the appended claims.

In the drawings—

FIG. 1 is a schematic diagram illustrating the general arrangement of one form of a device in accordance with the invention;

FIG. 2 is a similar schematic illustration of another form of a device in accordance with the invention;

FIG. 3 is a somewhat diagrammatic drawing of details of a device such as shown in FIG. 1;

Figure 5:
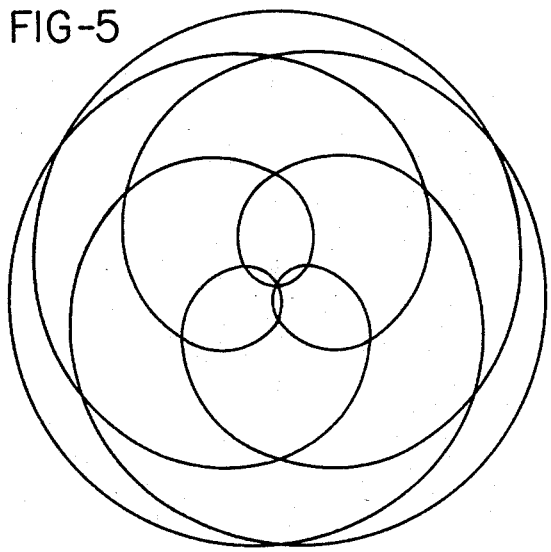
Figure 6:
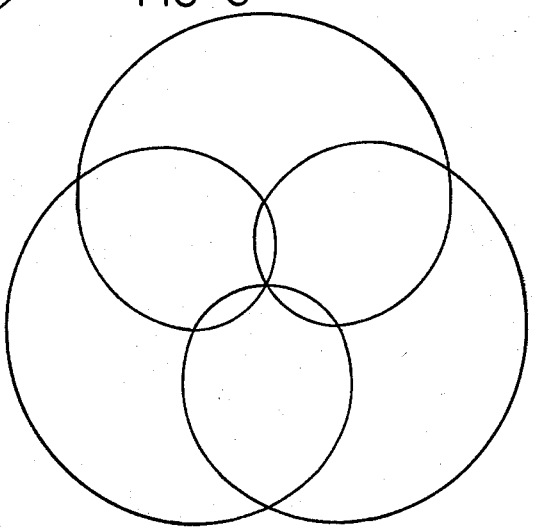
Figure 7:
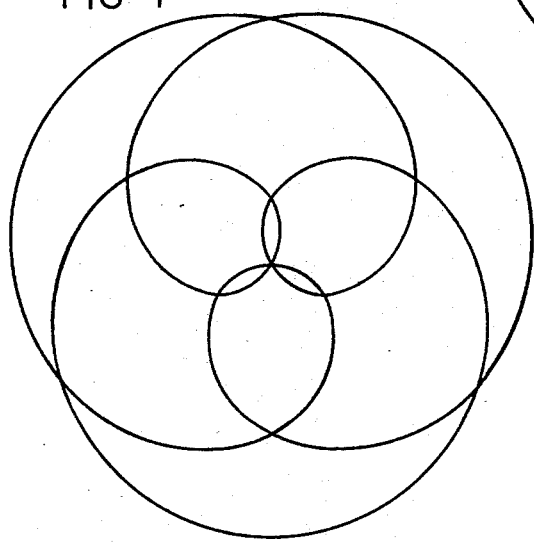

FIG. 4 is a diagrammatic illustration of a further form of a device according to the invention, illustrating the addition of controlled shifting motion of the mass member; and FIGS. 5, 6 and 7 are diagrams illustrating the type of paths which a point on the surface of a sphere can follow when the sphere is subjected to different combinations of rotary movements in accordance with the invention, it being understood that these illustrations are plane diagrams or projections of motions that in fact occur over a surface which is a portion of a sphere.

Referring to the drawings, which illustrate preferred embodiments of the invention, for ease of illustration the mass M is illustrated as a sphere or ball of uniform density, in FIGS. 1, 2 and 3. In order to produce the motion of this mass in accordance with the invention it is necessary to rotate the mass M about three different axes which intersect at the mass center and which have predetermined angular relationships.

Thus, in FIG. 1 there is shown an axle 10 rotatable about the primary axis $a$, in the direction as indicated by arrow 12. Attached to the axle 10 is an arm 14 which rotates with it. On this arm is a secondary axle 15 which extends along the secondary axis $b$, and this axle is caused to rotate in the direction shown by the arrow 17. Attached to axle 15 is a second arm 18, and from it there extends a third axle 20, along the tertiary axis $c$. The mass or ball M is fixed to the third axle 20 and is caused to rotate as shown.

With the axles coplanar the angular relationship between the axes $a$ and $b$, indicated by the angle A, is equal to the angle B between the axes $b$ and $c$. Thus, with the proper rotations induced, as indicated and as will be described, at certain times in the "cycle" of movement of the mass M, axes $a$ and $c$ will coincide momentarily, but the rotations of the mass about these axes are such that during this momentary linear coincidence the rotations will cancel.

As shown in FIG. 2, it is also possible to have a similar arrangement wherein the angle B' is the supplement of the angle A'. In this illustration, since the parts are identical or similar to those shown in FIG. 1, the same reference numerals have been applied to the parts, with the prime notation added. Thus angle B' equals 180° minus angle A'. Under these conditions, the relationship of rotation of the mass about the tertiary axis $c'$ and about the primary axis $a'$ will be the reverse of the condition described in FIG. 1, in order to provide the desired cancellation of these rotational effects when there is a coincidence of the axes $a'$ and $c'$.

It should be noted that in either case (FIG. 1 or FIG. 2), irrespective of the manner in which the arms are moved, the position of the center of the mass M will be unchanged.

FIG. 3 shows details of a drive for a device as shown in FIG. 1. Mass member M is shown, as a solid ball fixed to a supporting axle 22 by means of a flange 23 fastened to the ball, with the axis of the axle 22 intersecting the center of the ball. It will be assumed that the ball is a solid of uniform density and therefore its mass center will be at its physical center.

The axle 22 is mounted to rotate in a bearing support 25, which support is in turn carried at the end of a rotatable arm 28. The arm 28 is attached to a hollow tube 30 which forms an outer axle which can be rotated itself, but which is fixed to arm 28 in such a way that this arm will turn with it. The tube 28 is rotatably mounted and supported in a bearing member 32 which is carried on the end of a further or primary arm 35. Extending through the tube 30 is a second axle 37, which is fixed with respect to arm 35, that is it cannot rotate with respect to that arm, being clamped in place by a collar 38 which engages the end of the secondary axle 37 and which is mounted in fixed position on arm 35.

The arm 35 is in turn fastened to a drive sleeve 40, and a third axle 42 extends through the sleeve 40 and is rotatable relative thereto. Sleeve 40 is driven by a gear 44, and the axle 42 is driven by a gear 45, while these gears are in turn driven by pinions 46 and 47 mounted on a common drive shaft. The diameters and number of teeth of these gears can be selected such that the sleeve 40 and the axle 42 rotate in the same direction, as indicated by arrows 50 and 52, but at speeds which bear a predetermined ratio to each other. At the end of axle 42 there is a gear 55 which meshes with a gear 56 carried by the sleeve or tube 30, thus the tube 30, assuming for the moment that the arm 35 was held stationary, will be rotated in the opposite direction from the axle 42 by the drive between gears 55 and 56.

At the end of the secondary axle 37, which it will be recalled is fastened to arm 35 so that there is no rotation between these parts, there is a gear 60 which meshes with a final drive gear 62 fastened to the first axle 22. Assuming for purposes of explanation that arm 35 is held stationary, but that the drive is completed through gears 55 and 56, the arm 28 will be rotated by the tube or sleeve 30, and this will carry the axle 22 and its gear 62 around the gear 60, producing a rotation of the axle 22 and hence a rotation of the ball M fixed to it.

It will be noted from the drawings that the three axes, i.e., the axes of the member 22, 37 and 40, 42, all intersect at the center of the ball M. These axes are indicated by the lines $a$, $b$, and $c$, and they all intersect at the point $d$ which is the physical and mass center of the ball.

With the mechanism shown, it is thus possible to drive the gears 44 and 45 at predetermined speeds from a common input (e.g., gears 46 and 47 which are driven from a common shaft) and thus produce a first rotation of the ball about the axis $a$, as indicated by arrow 50, a second rotation of the ball about the axis $b$, which is in the opposite direction as indicated by arrow 65, and a third rotation of the ball about the axis $c$, which is in the direction indicated by the arrow 67 on gear 62. By properly selecting the size and number of gear teeth, it is possible to produce a rotation about axis $a$ and a rotation about axis $c$ which are equal but opposite, while the rotation about axis $b$ will have a predetermined ratio or relation with respect to the rotational speeds of $+a$ and $-c$.

It should further be stated that the various rotations imparted to the moving sphere, are stated each relative to the preceding support. The primary velocity input is measured with relation to the fixed support; the secondary velocity input is a constant with respect to the moving primary arm; the tertiary velocity input has a constant value with respect to the already moving secondary arm. Thus to an observer not participating in the motion only the primary input would seem constant and fixed. The secondary would appear as uniform rate rotation with its axis traversing a conical surface at a constant rate; the tertiary would seem to be variable at speeds from zero up to twice the primary input rate, and it would oscillate around the primary axle in a complex curve whose envelope would be the cone with its elements inclined to the primary axis at an angle of twice the angular span of the primary arm.

It should be understood that the arrangements shown in FIGS. 1, 2 and 3 are diagrammatic, and not necessarily indicative of the details of a device which can be constructed according to the invention. For example, it may be desirable to substitute for arms 28 and 38 gimbals or spherical members or polyhedral skeletons, or parts thereof, in order to obtain a more desirable lightweight construction which is resistant to deformation, fatiguing, etc., and to provide anchorage for counterweights. It is also, of course, possible to substitute for the gear drive any equivalent positive drive such as through chains and sprockets, timing belts and sprockets, or by using individual electrical motors which are closely governed to maintain the desired speed ratios. It is also possible to use gearing to obtain the desired positive drive relations, together with supplemental electrical motor drives at each axle to augment the power input. In such instances, of course, the electrical motors must likewise be speed governed to maintain the ratios desired.

Under some circumstances, as previously mentioned, it may be desirable to approximate symmetric motion, and as already stated this can be accomplished by slightly changing the velocity ratios. It might also be desirable to make the angular length of the secondary arm slightly different from the precise values shown in FIGS. 1 and 2, since this change also would produce asymmetry in the motion.

The highest orders of symmetry are produced by the ratios $4:\pm 3:-4$, $3:\pm 4:-3$, $5:\pm 3:-5$, and $3:\pm 5:-3$. A ratio of $1:\pm 1:-1$ produces a type of highly symmetric motion; other values appear to produce spheroidal symmetry in the distribution of motor components. Curves for three of these ratios are shown in FIGS. 5, 6 and 7.

FIGS. 5, 6 and 7 are diagrams illustrating different types of motion that can be imparted to a point on the mass subjected to triaxial motion in accordance with the invention. For example, with reference to FIG. 5, if a stylus 70 is mounted on the primary axis $a$, at the opposite side of the spherical mass M from the support and drive, as shown in FIG. 3, this stylus will trace on the surface of the sphere a certain path according to the ratio and directions of the individual rotations to which the mass is subjected by driving it simultaneously about the three different axes. FIG. 5 represents the path of such a point if the ratio of movement of the three axes is $+4:+3:-4$. It will be understood that if the sphere M is large enough, and the angles A and B are small enough, the spherical segment or portion over which this motion occurs, and on which the curve is scribed, can be of such large radius with respect to these angles that the trace is essentially in a plane.

FIG. 6 shows, in similar fashion, the path of motion of a point on the surface of the sphere M in FIG. 3 which would result if the ratio and directions of rotation about the three different axes are in the relationship of $+4:-3:-4$.

As another example, FIG. 7 illustrates the pattern obtained when the ratios previously described are $+5:-3:-5$. In any event, it will be appreciated that the movement of such a point on the surface of the spherical mass M is in a recurrent pattern which can be predetermined by proper selection of the drive ratios and directions.

By adding to the mass subjected to triaxial motion a further controlled and correctly phased reciprocating movement, either linear or resultant from rotation of an eccentric, it is possible to subject the mass to additional surge conditions. For example, as shown in FIG. 4, the mass M' is arranged to shift along the line $x—x$, which extends through the intersection point of the axes $a$, $b$ and $c$. By controlling the shifting motion of the mass member along the path $x—x$ in relation to the rotation of its mounting, such that the center of the mass member M' will be nearest the point of intersection of the axes when the tertiary axis $c$ is coincident with the primary axis $a$, and such that the center of the mass member M' is farthest away from the point of intersection of the axes when the tertiary axis $c$ is farthest from the primary axis $a$, it is possible to create different surge conditions than will result if the mass center remains at the intersection of the three axes of rotation, as in FIGS. 1–3.

As shown in FIG. 4, the drive for the primary rotating arm 114 is provided by a suitable electric motor indicated schematically as the motor I. On this arm 114 there is mounted a second electrical drive motor II, the output shaft of which is indicated at 115 and defines the axis of rotation of the secondary arm 118. On the other end of arm 114 there preferably is provided a counterweight 119 to provide balance for the weight of the motor II. Arm 118 in turn rotates about the secondary axis $b$, and at one end of that arm there is a further electric motor III having an output shaft 120 connected to a supporting ring 122. The shaft 120 defines the tertiary axis $c$. Ring 122 is driven by shaft 120, and the ring provides in turn a mounting for another motor IV driving a crank 125 which is connected to move the mass M' toward and away from the point of intersection of the three axes $a$, $b$ and $c$. Also, at the opposite end of arm 114 there is a counterweight 126 for the motor III, and at the opposite side of ring 122 there is a counterweight 128 for the motor IV.

It will be apparent that by supplying these electrical motors from a common power source, and by providing their outputs with appropriate gearing, any desired ratio of rotations can be provided between the motors I, II, III and IV, and likewise by appropriate electrical connections to the motors the desired directions of rotation can be obtained. Likewise, the properly phased motion of the mass member M' relative to the positions of the primary and tertiary axes, as previously defined can be achieved in the same manner.

Other suitable arrangements for moving the mass M' toward and away from the intersection of the primary, secondary and tertiary axes, in the proper phasing as described, can be provided. The important feature is to maintain the relationships of these axes and the phased movement of the mass M', as set forth. It should be made clear that FIG. 4 is a schematic representation only, to show the principles involved. In an actual mechanism it would be necessary to provide guides for the mass M' to prevent its rotation with respect to the ring 122 as it is shifted by the arm 125 along the line $x—x$. Further, for optimal results the center of mass M' should be held exactly on the line $x—x$ as it traverses between the limits of its motion within the ring 122.

It will be apparent from the foregoing description that the present invention provides a method and apparatus for maintaining a mass in a constant state of surge, thereby enabling the study of such surge conditions and mass increment effects which result from surge. The apparatus provided by the invention also makes possible the tracing of the movements of a point on a mass under such continuing surge conditions, whereby suitable plots can be obtained for inspection and study.

What is claimed is:

1. In device of the character described adapted to subject a mass member to surge conditions, the combination of a mass member, means supporting said mass member for triaxial motion about a point which is the intersection of primary, secondary, and tertiary axes extending at predetermined angles to each other such that rotation of said mass member about said secondary axis will bring said tertiary axis into coincidence with said primary axis, said supporting means including a first arm means arranged to rotate about said primary axis, a second arm means carried by said first arm means and rotatable with respect to said first arm means about said secondary axis, and a rotatable mounting carried on said second arm means defining the tertiary axis of rotation with respect to said second arm means and connected to said mass member, drive means acting on said arm means and said rotatable mounting to produce simultaneous rotation of said mass member about each of said axes at predetermined velocities with the component of rotational movement of said mass member about any one of said axes being a normally fixed rotational speed, said drive means including a first rotational drive for said first arm means, a second rotational drive for said second arm means operating at a predetermined and different rotational speed to bring said tertiary axis into coincidence with said primary axis in a cyclic manner, and a third rotational drive for said rotatable mounting operating at the same angular velocity as said first rotational drive and in the opposite direction of rotation whereby the rotational components of motion of said mass member about said primary and tertiary axes will cancel upon each coincidence thereof due to the rotational component of movement introduced by said second rotational drive.

2. Apparatus as defined in claim 1 wherein said mounting means includes a mechanism carrying by said rotatable mounting providing for confined shifting movement of said mass member toward and away from the point of intersection of said axes, and means cooperative with said drive means to phase the shifting movement of said mass member such that it will be located at one extreme of its shifting movement when said primary and tertiary axes coincide and at the other extreme of its shifting movement when said primary and tertiary axes are spaced farthest apart as permitted by said supporting means.

3. Apparatus as defined in claim 1, wherein said supporting means includes a mechanism providing for confined shifting movement of said mass member toward and away from the point of intersection of said axes, and means cooperative with said drive means to phase the shifting movement of said mass member such that it is shifted from one extreme to the other of its travel synchronously with the movement of said mass member about said secondary axis.

4. Apparatus for maintaining a mass in a state of surge from a system of constant rotational velocity drives, comprising a mass member, means mounting said mass member for shifting movement between predetermined limits, a first arm member mounted to rotate about a first axis, a second arm member mounted to rotate on said first arm member about a second axis, said mounting means having a connection to rotate on said second arm member about a third axis with said mass member aligned for shifting movement in predetermined relation to said third axis, said axes being related to each other such that said first axis and said third axis can coincide, power drive means operative on said arm members and said mounting means to produce simultaneous rotations of said mounting means about each of said axes at predetermined constant rotational velocities which are maintained in fixed ratio, and means for shifting said mass member in said mounting means in phased relation to the rotation of said mounting means about said second axis.

5. Apparatus as defined in claim 4 wherein the means for shifting said mass member in said mounting means is phased to the rotation of said mounting means such that the center of said mass member will be at one limit of its shifting movement when said third axis is in its closest position to alignment with said first axis and at the other limit of its shifting movement when said third axis is in its farthest location from said first axis.

References Cited by the Examiner

UNITED STATES PATENTS

| 2,389,826 | 11/1945 | Stalker | 74—64 |
| 3,108,185 | 10/1963 | Buerger | 74—86 X |
| 3,187,635 | 6/1965 | Koss. | |

FOREIGN PATENTS

| 595,379 | 6/1925 | France. |
| 1,214,516 | 11/1959 | France. |

OTHER REFERENCES

Analytical Experimental Physics; Lemon and Ference; pages 48–51; publisher—The University of Chicago, Press; Chicago, Illinois; Library—QC 21, L4, 1946.

FRED C. MATTERN, JR., *Primary Examiner.*

BROUGHTON G. DURHAM, MILTON KAUFMAN, *Examiners.*

D. H. THIEL, *Assistant Examiner.*